(12) United States Patent
Rege et al.

(10) Patent No.: US 11,546,908 B2
(45) Date of Patent: Jan. 3, 2023

(54) HISTORY AUGMENTED SYNCHRONIZATION SIGNAL BASED ANTENNA BEAM SELECTION

(71) Applicant: QUALCOMM Incorporated, San Diego, CA (US)

(72) Inventors: Vishwesh Pratap Rege, San Diego, CA (US); Jyothi Kiran Vattikonda, San Diego, CA (US); Mihir Vijay Laghate, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 36 days.

(21) Appl. No.: 17/339,494

(22) Filed: Jun. 4, 2021

(65) Prior Publication Data

US 2021/0392633 A1 Dec. 16, 2021

Related U.S. Application Data

(60) Provisional application No. 63/037,403, filed on Jun. 10, 2020.

(51) Int. Cl.
| | |
|---|---|
| *H04W 4/00* | (2018.01) |
| *H04W 72/04* | (2009.01) |
| *H04W 74/08* | (2009.01) |
| *H04W 56/00* | (2009.01) |

(52) U.S. Cl.
CPC ..... *H04W 72/046* (2013.01); *H04W 56/0015* (2013.01); *H04W 74/0833* (2013.01)

(58) Field of Classification Search
CPC .......... H04W 72/046; H04W 56/0015; H04W 74/0833
See application file for complete search history.

(56) References Cited

U.S. PATENT DOCUMENTS

| | | | |
|---|---|---|---|
| 10,980,064 B2 * | 4/2021 | Narasimha | H04W 74/0833 |
| 2018/0279387 A1 * | 9/2018 | Hui | H04W 74/0833 |
| 2019/0230545 A1 * | 7/2019 | Liou | H04W 76/19 |

(Continued)

FOREIGN PATENT DOCUMENTS

| | | | |
|---|---|---|---|
| WO | WO-2020030282 A1 * | 2/2020 | H04B 7/0695 |
| WO | WO-2021152540 A1 * | 8/2021 | |

*Primary Examiner* — Thai D Hoang
(74) *Attorney, Agent, or Firm* — Norton Rose Fulbright LLP

(57) ABSTRACT

Systems and apparatuses providing history augmented synchronization signal based antenna beam selection are described. History augmented synchronization signal based antenna beam selection of an antenna beam may be based on receive metrics and beam historical information. Receive metrics may include a measured aspect for synchronization signal transmitted via a respective antenna beam. Beam historical information may include information regarding a previous random access channel (RACH) procedure attempt using an antenna beam of the plurality of antenna beams, information regarding physical broadcast channel (PBCH) decode history for an antenna beam of the plurality of antenna beams, information regarding recency of a measurement of an aspect of the synchronization signal corresponding to an antenna beam of the plurality of antenna beams as received when scanning the antenna beam, etc. Other aspects and features are also claimed and described.

30 Claims, 5 Drawing Sheets

(56) References Cited

U.S. PATENT DOCUMENTS

| | | | |
|---|---|---|---|
| 2019/0253308 A1* | 8/2019 | Huang | H04B 7/0695 |
| 2019/0268947 A1* | 8/2019 | Zhang | H04B 7/088 |
| 2019/0274169 A1* | 9/2019 | Tsai | H04W 56/003 |
| 2020/0107235 A1* | 4/2020 | Peisa | H04W 36/0061 |
| 2020/0107275 A1* | 4/2020 | Cho | H04W 74/0833 |
| 2020/0296765 A1* | 9/2020 | Kim | H04W 56/001 |
| 2021/0136823 A1* | 5/2021 | Kim | H04W 74/0891 |
| 2021/0289558 A1* | 9/2021 | Han | H04W 74/0833 |
| 2021/0392633 A1* | 12/2021 | Rege | H04W 72/046 |
| 2022/0264659 A1* | 8/2022 | Enbuske | H04B 17/318 |

* cited by examiner

HISTORY AUGMENTED SYNCHRONIZATION SIGNAL BASED ANTENNA BEAM SELECTION

CROSS-REFERENCE TO RELATED APPLICATIONS

This application claims the benefit of U.S. Provisional Patent Application No. 63/037,403, entitled, "HISTORY AUGMENTED SYNCHRONIZATION SIGNAL BASED ANTENNA BEAM SELECTION," filed on Jun. 10, 2020, the disclosure of which is expressly incorporated by reference herein in its entirety.

TECHNICAL FIELD

Aspects of the present disclosure relate generally to wireless communication systems, and more particularly, to antenna beam selection. Certain embodiments of the technology discussed below can enable and provide for history augmented synchronization signal based antenna beam selection, such as for use in a random access channel (RACH) procedure.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

Various beamforming techniques may, for example, be utilized for avoiding interference in a wireless network. Beamforming, which may also be referred to as spatial filtering, directional transmission, or directional reception, is a signal processing technique that may be used at a transmitting device and/or a receiving device (e.g., a base station, a UE, etc.) to shape or steer one or more antenna beams (e.g., transmit beams or receive beams) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation). Using such beamforming techniques, antenna beams of various configurations (e.g., orientations, widths, lengths, azimuthal directions, etc.) may be provided, such as for selection of a particular antenna beam avoiding interfering signals, facilitating acceptable signal reception, and/or the like.

UEs may implement cell search operations (e.g., when a UE is powered on, during mobility in connected mode or idle mode, as part of inter-RAT (radio access technology) mobility, etc.) using synchronization signal blocks (SSBs) (e.g., including synchronization signals and physical broadcast channel (PBCH)) transmitted by base stations of one or more cells to derive information for accessing a cell. Where a base station transmits SSBs via multiple antenna beams, the UE may select a particular antenna beam with respect to that cell based on the corresponding SSB, such as by using measured reference signal receive power (RSRP) metrics for the SSB.

BRIEF SUMMARY OF SOME EMBODIMENTS

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication is provided. The method may include storing receive metrics for a plurality of synchronization signals corresponding to a plurality of antenna beams. The receive metrics may include a receive metric for each synchronization signal of the plurality of synchronization signals. Each synchronization signal of the plurality of synchronization signals may correspond to a respective antenna beam of the plurality of antenna beams. The method may also include storing beam historical information regarding one or more antenna beams of the plurality of antenna beams. Further, the method may include communicating a random access channel (RACH) procedure signal using an antenna beam from the plurality of antenna beams selected in correspondence to the receive metrics and the beam historical information.

In an additional aspect of the disclosure, an apparatus configured for wireless communication is provided. The apparatus may include means for storing receive metrics for a plurality of synchronization signals corresponding to a plurality of antenna beams. The receive metrics may include a receive metric for each synchronization signal of the plurality of synchronization signals. Each synchronization signal of the plurality of synchronization signals may correspond to a respective antenna beam of the plurality of antenna beams. The apparatus may also include means for storing beam historical information regarding one or more antenna beams of the plurality of antenna beams. Further, the apparatus may include means for communicating a RACH procedure signal using an antenna beam from the plurality of antenna beams selected in correspondence to the receive metrics and the beam historical information.

In an additional aspect of the disclosure, a non-transitory computer-readable medium having program code recorded thereon for wireless communication is provided. The program code may include code to store receive metrics for a plurality of synchronization signals corresponding to a plurality of antenna beams. The receive metrics may include a receive metric for each synchronization signal of the plurality of synchronization signals. Each synchronization signal of the plurality of synchronization signals may correspond to a respective antenna beam of the plurality of antenna beams. The program code may also include code to store beam historical information regarding one or more antenna beams of the plurality of antenna beams. Further, the program code may include code to communicate a RACH procedure signal using an antenna beam from the plurality of antenna beams selected in correspondence to the receive metrics and the beam historical information.

In an additional aspect of the disclosure, an apparatus configured for wireless communication is provided. The apparatus includes at least one processor, and a memory coupled to the processor. The processor may be configured to store receive metrics for a plurality of synchronization signals corresponding to a plurality of antenna beams. The receive metrics may include a receive metric for each synchronization signal of the plurality of synchronization signals. Each synchronization signal of the plurality of synchronization signals may correspond to a respective antenna beam of the plurality of antenna beams. The processor may also be configured to store beam historical information regarding one or more antenna beams of the plurality of antenna beams. Further, the processor may be configured to communicate a RACH procedure signal using an antenna beam from the plurality of antenna beams selected in correspondence to the receive metrics and the beam historical information.

In one aspect of the disclosure, a method of wireless communication is provided. The method may include storing receive metrics for a plurality of synchronization signals corresponding to a plurality of antenna beams. The receive metrics may include a receive metric for each synchronization signal of the plurality of synchronization signals. Each synchronization signal of the plurality of synchronization signals may correspond to a respective antenna beam of the plurality of antenna beams. The method may also include storing beam historical information regarding one or more antenna beams of the plurality of antenna beams. Further, the method may include selecting an antenna beam from the plurality of antenna beams for RACH procedure signal transmission based on the receive metrics and the beam historical information.

In an additional aspect of the disclosure, an apparatus configured for wireless communication is provided. The apparatus may include means for storing receive metrics for a plurality of synchronization signals corresponding to a plurality of antenna beams. The receive metrics may include a receive metric for each synchronization signal of the plurality of synchronization signals. Each synchronization signal of the plurality of synchronization signals may correspond to a respective antenna beam of the plurality of antenna beams. The apparatus may also include means for storing beam historical information regarding one or more antenna beams of the plurality of antenna beams. Further, the apparatus may include means for selecting an antenna beam from the plurality of antenna beams for RACH procedure signal transmission based on the receive metrics and the beam historical information.

In an additional aspect of the disclosure, a non-transitory computer-readable medium having program code recorded thereon for wireless communication is provided. The program code may include code to store receive metrics for a plurality of synchronization signals corresponding to a plurality of antenna beams. The receive metrics may include a receive metric for each synchronization signal of the plurality of synchronization signals. Each synchronization signal of the plurality of synchronization signals may correspond to a respective antenna beam of the plurality of antenna beams. The program code may also include code to store beam historical information regarding one or more antenna beams of the plurality of antenna beams. Further, the program code may include code to select an antenna beam from the plurality of antenna beams for RACH procedure signal transmission based on the receive metrics and the beam historical information.

In an additional aspect of the disclosure, an apparatus configured for wireless communication is provided. The apparatus includes at least one processor, and a memory coupled to the processor. The processor may be configured to store receive metrics for a plurality of synchronization signals corresponding to a plurality of antenna beams. The receive metrics may include a receive metric for each synchronization signal of the plurality of synchronization signals. Each synchronization signal of the plurality of synchronization signals may correspond to a respective antenna beam of the plurality of antenna beams. The processor may also be configured to store beam historical information regarding one or more antenna beams of the plurality of antenna beams. Further, the processor may be configured to select an antenna beam from the plurality of antenna beams for RACH procedure signal transmission based on the receive metrics and the beam historical information.

In accordance with aspects of the disclosure, the foregoing systems, methods, and apparatuses may be implemented in combination with one or more additional features, such as the following features whether alone or in combination. For example, the above systems, methods, and apparatuses may include the synchronization signals each comprising a synchronization signal block (SSB) transmitted via a respective antenna beam of the plurality of antenna beams. The above systems, methods, and apparatuses may include analyzing the beam historical information for one or more antenna beams of the plurality of antenna beams meeting a historical selection threshold, and comparing the receive metrics of the one or more antenna beams meeting the historical selection threshold, wherein the selecting the antenna beam is based at least in part on the antenna beam selected meeting the historical selection threshold and the comparing of the receive metric for the selected antenna beam. The above systems, methods, and apparatuses may include weighting the receive metrics of the one or more antenna beams using recency information of the historical information, and comparing the receive metrics of the one or more antenna beams as weighted, wherein the selecting the antenna beam is based at least in part on the comparing of the receive metric for the selected antenna beam. The above systems, methods, and apparatuses may include the beam historical information having information regarding a previous RACH procedure attempt using an antenna beam of the plurality of antenna beams and information regarding physical broadcast channel (PBCH) decode history for an antenna beam of the plurality of antenna beams. The above systems, methods, and apparatuses may include the beam historical information having information regarding a beam failure event for an antenna beam of the plurality of antenna beams corresponding to a synchronization signal of the plurality of synchronization signals. The above systems, methods, and apparatuses may include determining for each antenna beam of the plurality of antenna beams if a historical selection threshold based on beam failure recovery being triggered within a recency window is met, wherein the selecting the antenna beam is based at least in part on a determination provided by the determining. The above systems, methods, and apparatuses may include determining if the historical selection threshold is met including determining if a beam failure event was experienced in a previous RACH procedure attempt within the recency window. The above systems, methods, and apparatuses may include determining if the historical selection threshold is met including determining if a beam failure event was experienced based upon any beam failure trigger within the recency window. The above systems, methods, and apparatuses may include selecting the antenna beam avoiding selection of antenna beams of the plurality of antenna beams determined to have failed to meet the historical selection threshold based on a beam failure recovery triggered within the recency window. The above systems, methods, and apparatuses may include beam historical information including information regarding a previous RACH procedure attempt using an antenna beam of the plurality of antenna beams corresponding to a synchronization signal of the plurality of synchronization signals. The above systems, methods, and apparatuses may include determining for each antenna beam of the plurality of antenna beams if a historical selection threshold based on a RACH procedure attempt failure within a recency window is met, wherein selecting the antenna beam is based at least in part on a determination provided by the determining. The above systems, methods, and apparatuses may include determining if the historical selection threshold is met including determining if a beam failure event was experienced in the RACH procedure attempt within the recency window. The above systems, methods, and apparatuses may include determining if the historical selection threshold is met including determining if any RACH procedure failure trigger was experienced within the recency window. The above systems, methods, and apparatuses may include selecting the antenna beam avoiding selection of antenna beams of the plurality of antenna beams determined to have had a RACH procedure attempt failure within the recency window. The above systems, methods, and apparatuses may include determining whether transmission during the RACH procedure attempt that failed was performed at less than a maximum permitted transmission power. The above systems, methods, and apparatuses may include selecting the antenna beam being based at least in part on a transmission power used for transmission during the RACH procedure attempt that failed. The above systems, methods, and apparatuses may include selecting the antenna beam avoiding selection of antenna beams of the plurality of antenna beams determined to have had a RACH procedure attempt failure performed at a transmission power greater than a threshold value within the recency window. The above systems, methods, and apparatuses may include beam historical information having information regarding recency of a measurement of an aspect of the synchronization signal corresponding to an antenna beam of the plurality of antenna beams as received when scanning the antenna beam. The above systems, methods, and apparatuses may include selecting the antenna beam implementing a preference for selection of antenna beams of the plurality of antenna beams based on the information regarding recency of the measurement of the aspect of the synchronization signal. The above systems, methods, and apparatuses may include electing the antenna beam implementing a preference for antenna beams having most recent information regarding recency of the measurement of the aspect of the synchronization signal. The above systems, methods, and apparatuses may include determining for each antenna beam of the plurality of antenna beams if a historical selection threshold based on recency of the measurement of the aspect of the synchronization signal is met, wherein the selecting the antenna beam is based at least in part on a determination provided by the determining. The above systems, methods, and apparatuses may include determining if the historical selection threshold is met including determining if measurement of the aspect of the synchronization signal has been made for the respective antenna beam within a time threshold. The above systems, methods, and apparatuses may include scanning each antenna beam of the plurality of antenna beams serially, and measuring an aspect of the synchronization signal corresponding to an antenna beam of the plurality of antenna beams as received when the scanning is scanning the antenna beam, wherein the receive metric for each synchronization signal comprises a measured aspect for the respective antenna beam of the plurality of antenna beams obtained by the measuring. The above systems, methods, and apparatuses may include the measured aspect including a reference signal receive power (RSRP).

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments. In similar fashion, while exemplary embodiments may be discussed below as device, system, or method embodiments the exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
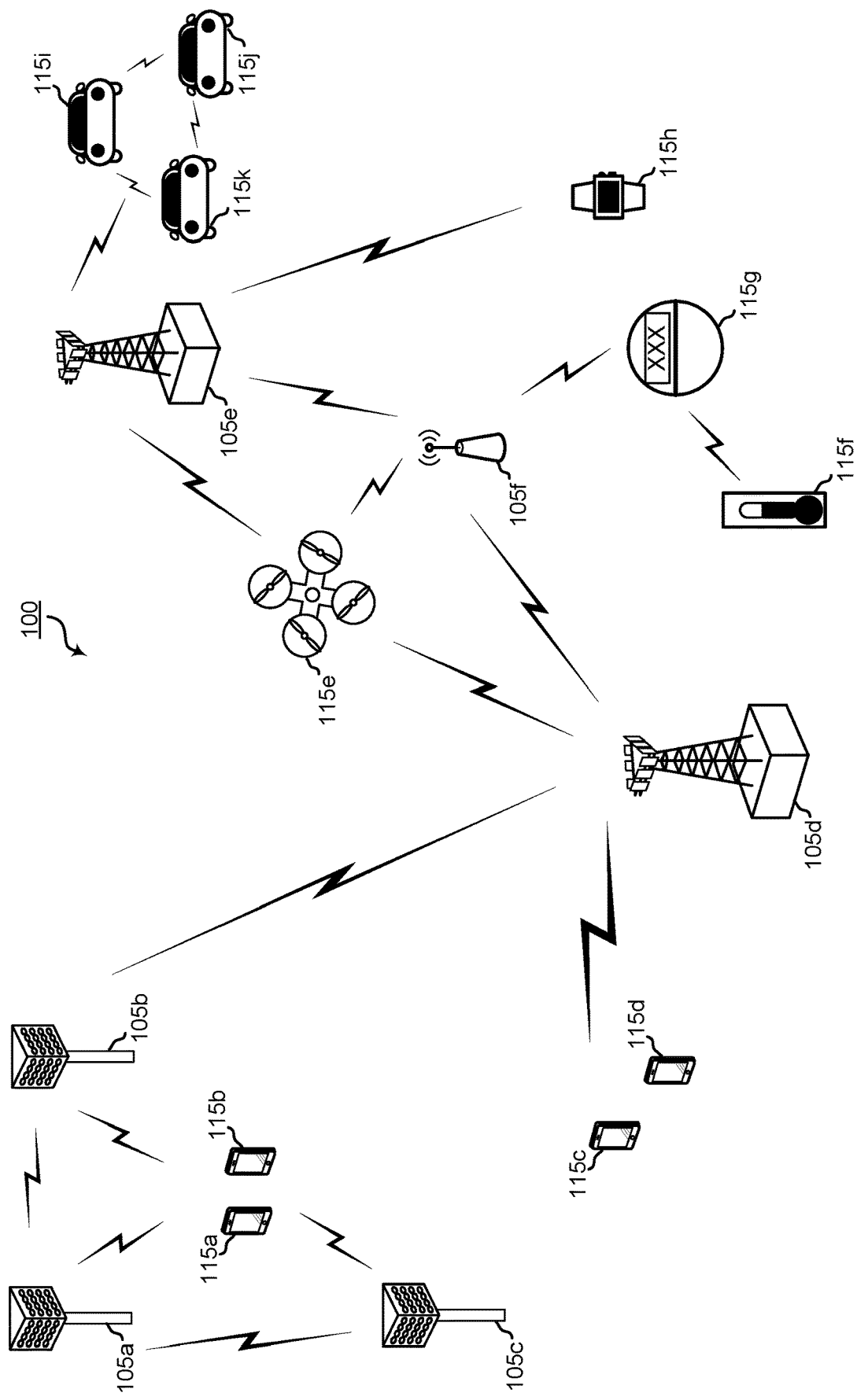
FIG. 1 is a block diagram illustrating details of a wireless communication system according to some embodiments of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km2), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some embodiments. Wireless network 100 may, for example, comprise a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may comprise a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the embodiment illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of embodiments supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
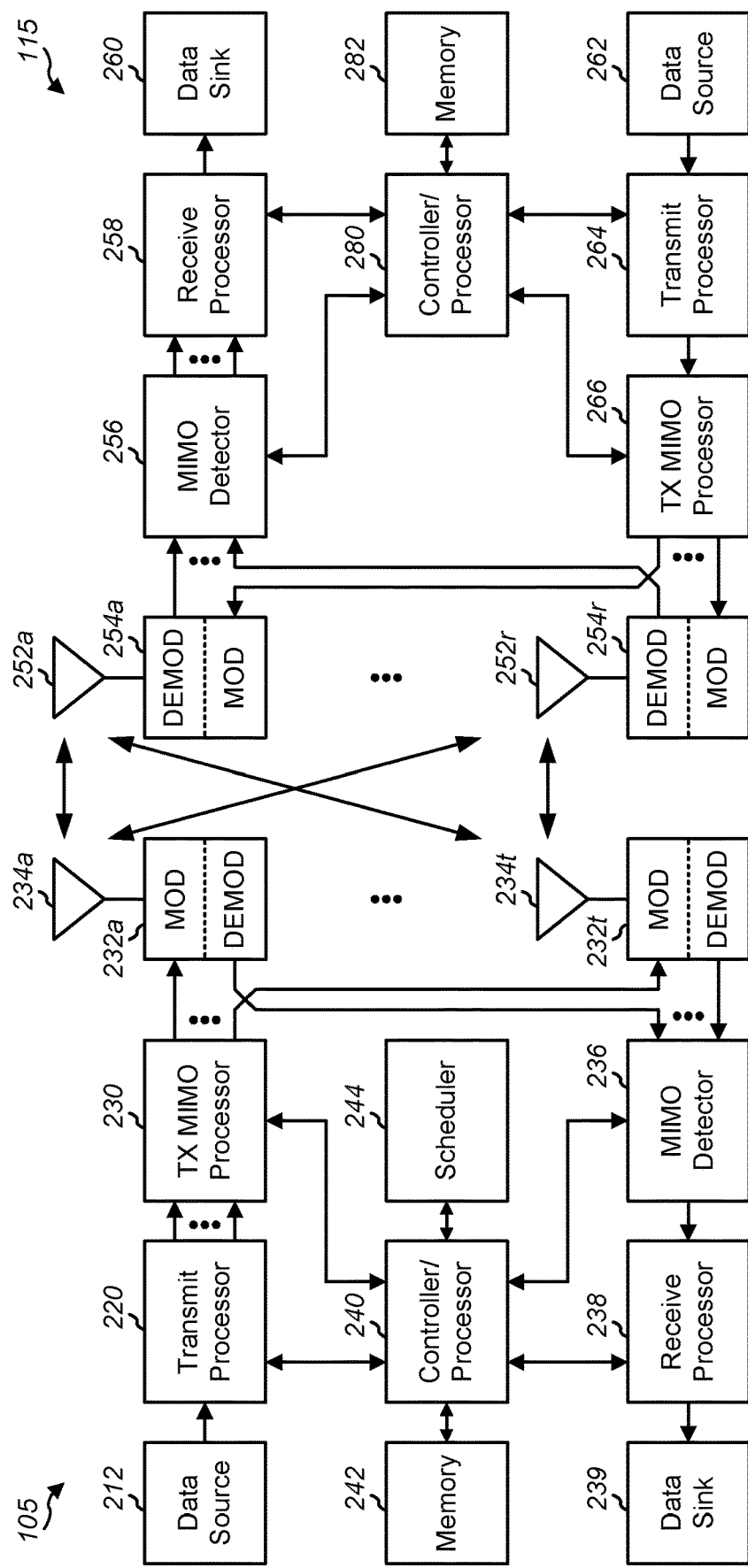
FIG. 2 is a block diagram conceptually illustrating a design of a base station and a UE configured according to some embodiments of the present disclosure.

FIG. 2 shows a block diagram of a design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, the antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIG. 4, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Beamforming may be utilized by one or more devices of wireless network 100, such as for avoiding interference, for providing improved signal conditions at a receiving device, etc. In one example, a base station 105 may use multiple antennas or antenna arrays to conduct beamforming operations to provide multiple antenna beams for directional communications with a UE 115. For instance, as shown in FIG. 3, some signals (e.g. synchronization signals, reference signals, beam selection signals, or other control signals) may be transmitted by a base station 105 using a plurality of antenna beams (shown as antenna beams 305a-305n) having different configurations (e.g., different azimuthal directions, beam widths, beam lengths, beam orientations, etc.), such as for identifying an antenna beam for subsequent wireless communication (e.g., for signal transmission from base station 105 to UE 115 and/or signal reception by base station 105 from UE 115).

Figure 3:
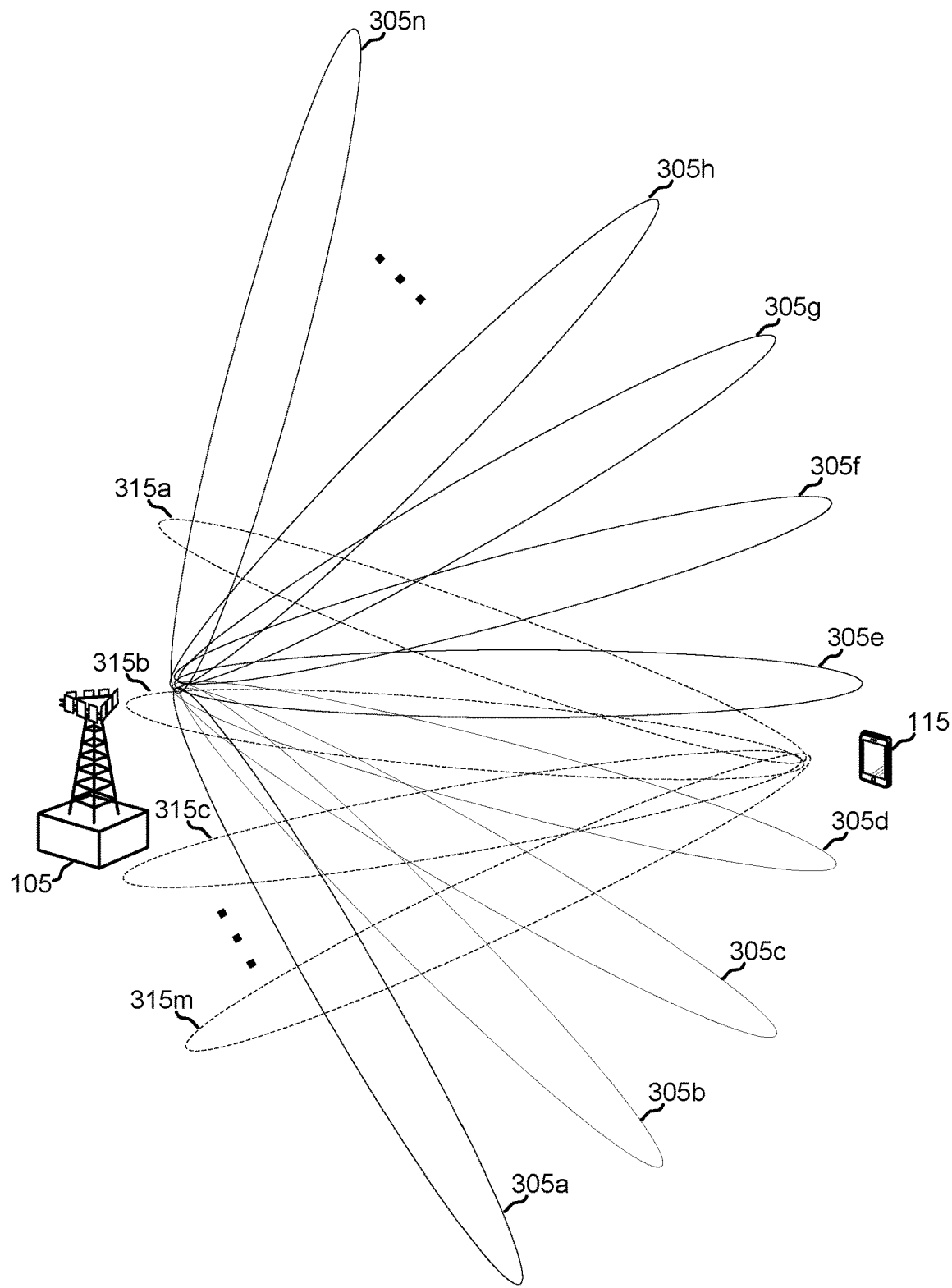
FIG. 3 is an example of use of a plurality of antenna beams according to some embodiments of the present disclosure.

Different synchronization signal blocks (SSBs) (e.g., including synchronization signals, such as a PSS and a SSS, and physical broadcast channel (PBCH)) may be transmitted by base station 105 of FIG. 3 in each of antenna beams 305a-305n (e.g., distinctive SSBs transmitted in each antenna beam). In some examples, the particular antenna beam may be determined by a device receiving the transmission based at least in in part on a SSB that was transmitted therein. For example, a UE 115 may receive one or more of the SSBs transmitted by the base station 105 in different antenna beams, and the SSB received by UE 115 with a highest signal quality, or otherwise acceptable signal quality, may be used for identifying a particular antenna beam of the plurality of antenna beams to use for communicating with base station 105.

Although the foregoing beam forming techniques have been described with reference to a base station, a UE may employ similar beam forming techniques for transmitting and/or receiving signals. For example, a UE 115 may use multiple antennas or antenna arrays to conduct beamforming operations to provide multiple antenna beams for directional communications with a base station 105. As shown in FIG. 3, UE 115 may use a plurality of antenna beams (shown as antenna beams 315a-315m) having different configurations (e.g., different azimuthal directions, beam widths, beam lengths, beam orientations, etc.), such as for identifying an antenna beam for subsequent wireless communication (e.g., for signal transmission from UE 115 to base station 105 and/or signal reception by UE 115 from base station 105). UE 115, which may be an example of a mmWave receiving device, may try multiple receive beams when receiving various signals (e.g., the above mentioned SSBs) from the base station 105.

In an example, UE 115 may scan each antenna beam of a plurality of antenna beams (e.g., scan antenna beams 305a-305n and/or antenna beams 315a-315m) to measure an aspect of a received signal (e.g., a reference signal receive power (RSRP) of a SSB corresponding to an antenna beam scanned). For example, UE 115 may scan or otherwise monitor each of antenna beams 305a-305n serially (e.g., in an organized sequence) to measure RSRP and/or other receive metric(s) for the respective antenna beam as received by the UE. Additionally or alternatively, UE 115 may scan or otherwise monitor each of antenna beams 315a-315m serially (e.g., in an organized sequence) to measure RSRP and/or other receive metric(s) for the respective antenna beam as received by the UE. In a situation in which UE 115 scans both a plurality of base station antenna beams and a plurality of UE antenna beams, the UE may scan a first base station antenna beam (e.g., antenna beam 305a) using each of UE antenna beams 315a-315m (e.g., scanning the UE antenna beams serially), scan a second base station antenna beam (e.g., antenna beam 305b) using each of UE antenna beams 315a-315m (e.g., scanning the UE antenna beams serially), and so on. Alternatively, the UE may scan each of base station antenna beams 305a-305n (e.g., scanning the base station antenna beams serially) using a first UE antenna beam (e.g., antenna beam 315a), scan each of base station antenna beams 305a-305n (e.g., scanning the base station beams serially) using a second UE antenna beam (e.g., antenna beam 315b), and so on. In other examples, the UE may scan each of base station antenna beams 305a-305n and UE antenna beams 315a-315m according to different patterns (e.g., a base station antenna beam and UE antenna beam interleaved sequence). Irrespective of the particular scanning sequence, UE 115 may thus store receive metrics (e.g., RSRP) for each SSB corresponding to a respective antenna beam of the base station antenna beams, such as within a synchronization signal receive metric database.

Having receive metrics for synchronization signals (e.g., SSBs) associated with specific base station antenna beams, a UE may select (e.g., using RSRP metrics for the SSBs) a particular base station antenna beam and/or UE antenna beam (e.g., in the case of mmWave), such as for physical random access channel (PRACH) transmission. In current implementations, a UE loops through (e.g., in round robin fashion) all the RSRP metrics for the SSBs stored in the UE's database to identify the SSB having the highest or best RSRP metric for random access channel (RACH) procedure antenna beam selection (e.g., selection of a base station antenna beam and/or UE antenna beam). This process can take time on the order of hundreds of milliseconds. Accordingly, an antenna beam selection may be made based upon receive metrics for a particular synchronization signal despite the suitability of any particular antenna beam configuration possibly having changed appreciably from the time of obtaining the synchronization signal receive metrics (e.g., the UE may have changed positions relative to the base station, a particular SSB may no longer be transmitting, or the RSRP metrics based on previous measurements may otherwise be stale) to the time of antenna beam selection. For example, if a particular synchronization signal had a strong signal in the past, but is no longer the best signal, it can take a long time for this information to be reflected in the UE's database. RACH antenna beam selection according to this current methodology can lead to several failed RACH attempts before identifying a suitable antenna beam for PRACH transmission.

In accordance with aspects of the present disclosure, a history augmented synchronization signal based antenna beam selection technique, taking into account various information available to the UE about which is the best antenna beam for communication, may be implemented. For example, a history augmented synchronization signal based antenna beam selection technique of some embodiments may be implemented for antenna beam selection for a RACH procedure.

UEs implementing history augmented synchronization signal based antenna beam selection may be configured to store beam historical information regarding one or more antenna beams of a plurality of antenna beams, such as within a beam history database. Such beam historical information may be used in combination with receive metrics for a plurality of synchronization signals for antenna beam selection (e.g., selection of a base station antenna beam and/or UE antenna beam), such as for RACH procedure signal transmission.

A UE may, for example, record information in a beam history database regarding previous RACH attempts, PBCH decode history, beam failure events, etc. for various antenna beams (e.g., corresponding to synchronization signals monitored by the UE and for which receive metrics are stored in a synchronization signal receive metric database). For example, as the UE performs various communication operations or attempts (e.g., RACH attempts, idle mode and/or connected mode communications, etc.), the UE may record such beam historical information in a beam history database for use in history augmented synchronization signal based beam selection.

A UE may additionally or alternatively record information in a beam history database regarding recency of various events, actions, etc. of beam historical information. Such recency information may, for example, provide time information (e.g., time/date, relative time, etc.) with respect to previous RACH attempts, PBCH decode history events, beam failure events, etc. of the beam history database. Additionally or alternatively, recency information may be with respect to a measurement of an aspect of the synchronization signal corresponding to an antenna beam as received when scanning the antenna beam. For example, in association with the UE performing scanning of each antenna beam of a plurality of antenna beams (e.g., scanning antenna beams 305a-305n and/or antenna beams 315a-315m) to measure an aspect of a received signal, the UE may record time information (e.g., time/date, relative time, etc. of receive metric measurement) in a beam history database for use in history augmented synchronization signal based beam selection.

History augmented synchronization signal based antenna beam selection implemented in accordance with some aspects of the disclosure takes into account the recency of measurements and/or successful attempts as a criteria to select antenna beams for communication. In scenarios where history augmented synchronization signal based antenna beam selection is used for RACH procedure antenna beam selection, the technique generally results in better RACH performance than an approach that only considers RSRP metrics.

Figure 4:
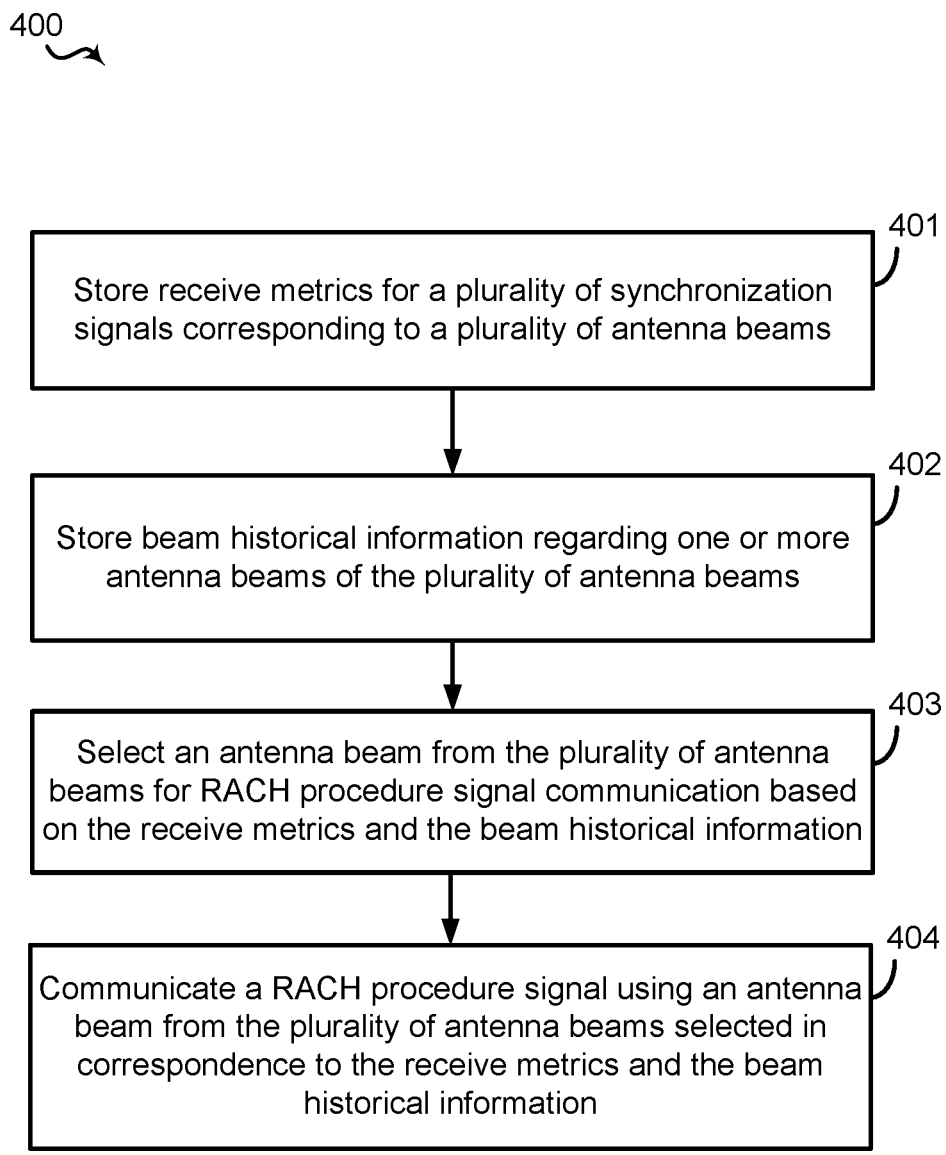
FIG. 4 is a flow diagram providing history augmented synchronization signal based antenna beam selection according to some embodiments of the present disclosure.

FIG. 4 shows flow 400 providing history augmented synchronization signal based antenna beam selection according to aspects of the present disclosure. Flow 400 may, for example, be implemented by logic (e.g., history augmented antenna beam selection logic implemented by program code, as may be stored in one or more memories such as memory 282, executed by one or more controller/processors, such as controller/processor 280) of one or more UEs of wireless network 100, such as for antenna beam selection with respect to a RACH procedure. Although embodiments are described herein with reference to implementation of the functions of flow 400 by a UE, it should be appreciated that other wireless devices (e.g., base stations) may implement a history augmented synchronization signal based antenna beam selection technique such as that provided by flow 400 according to some aspects of the disclosure.

At block 401 of flow 400, receive metrics for a plurality of synchronization signals corresponding to a plurality of antenna beams are stored. For example, a UE may scan (e.g., using antennas 252a-252r, demodulators 254a-254r, MIMO detector 256, and receive processor 258 operating under control of controller/processor 280) each antenna beam of a plurality of antenna beams (e.g., scan antenna beams 305a-305n and/or antenna beams 315a-315m) to measure an aspect of a received signal to provide a respective receive metric stored in a synchronization signal receive metric database (e.g., a database within memory 282 stored under control of controller/processor 280). The receive metrics may include a receive metric for each synchronization signal of the plurality of synchronization signals, wherein each synchronization signal of the plurality of synchronization signals corresponds to a respective antenna beam of the plurality of antenna beams. In accordance with some aspects of the disclosure, the measured aspect may include a RSRP. The synchronization signals may each comprise a distinctive SSB transmitted via a respective antenna beam of the plurality of antenna beams.

Beam historical information regarding one or more antenna beams of the plurality of antenna beams is stored at block 402 of flow 400. For example, a UE may record information in a beam history database (e.g., a database within memory 282 stored under control of controller/processor 280) regarding the use, operation, monitoring, etc. of antenna beams of the plurality of antenna beams to provide beam historical information. The beam historical information may, for example, include information regarding a previous RACH procedure attempt using an antenna beam of the plurality of antenna beams, information regarding PBCH decode history for an antenna beam of the plurality of antenna beams, information regarding recency of a measurement of an aspect of the synchronization signal corresponding to an antenna beam of the plurality of antenna beams as received when scanning the antenna beam, etc.

At block 403 of flow 400, an antenna beam from the plurality of antenna beams is selected based on or otherwise in correspondence to the receive metrics and the beam historical information. For example, an antenna beam for RACH procedure signal communication may be selected (e.g., by history augmented antenna beam selection logic executing on controller/processor 280) based on the receive metrics and the beam historical information. In operation in accordance with some aspects of the disclosure, history augmented antenna beam selection logic of a UE may analyze the beam historical information for one or more antenna beams of the plurality of antenna beams meeting a historical selection threshold (e.g., beam failure recovery being triggered within a recency window, RACH procedure attempt failure within a recency window, recency of the measurement of the aspect of the synchronization signal, etc.). The receive metrics of antenna beams meeting a historical selection threshold may be compared for selecting an antenna beam. For example, where beam historical information for more than one antenna beam meets a historical selection threshold, the receive metrics of those antenna beams may be compared for identifying a highest or best receive metric. An antenna beam may be selected as meeting a historical selecting threshold and having a highest receive metric of antenna beams of the plurality of antenna beams meeting the historical selection threshold.

An antenna beam of the antenna beams meeting the historical selection threshold corresponding to the identified receive metric may be selected for communication (e.g., for PRACH transmission). Accordingly, at block 404 of the example of FIG. 4, a RACH procedure signal is communicated using an antenna beam from the plurality of antenna beams selected in correspondence to the receive metrics and the beam historical information. For example, a UE may transmit and/or receive (e.g., using antennas 252a-252r, modulators/demodulators 254a-254r, TX MIMO processor 266, transmit processor 264, MIMO detector 256, and/or receive processor 258 operating under control of controller/processor 280) one or more RACH procedure signal using an antenna beam (e.g., one or more of antenna beams 305a-305n and/or antenna beams 315a-315m) selected based on or otherwise in correspondence to the receive metrics and the beam historical information (e.g., by history augmented antenna beam selection logic executing on controller/processor 280).

In an example where the beam historical information includes information regarding a beam failure event for an antenna beam of the plurality of antenna beams corresponding to a synchronization signal of the plurality of synchronization signals, history augmented antenna beam selection logic of a UE may determine (e.g., for each antenna beam of the plurality of antenna beams) if a historical selection threshold based on beam failure recovery being triggered within a recency window is met. An antenna beam used for communicating a RACH procedure signal may, for example, meet a historical selection threshold for beam failure recovery being triggered within a recency window. Determining if the historical selection threshold is met may, for example, include determining if a beam failure event was experienced in a previous RACH procedure attempt within the recency window, determining if a beam failure event was experienced based upon any beam failure trigger within the recency window, etc. In some examples, an antenna beam used for communicating a RACH procedure signal may meet a historical information threshold based on a RACH procedure attempt failure within a recency window. Selecting the antenna beam based at least in part on the determination may avoid selection of antenna beams of the plurality of antenna beams determined to have failed to meet the historical selection threshold based on a beam failure recovery triggered within the recency window. For example, if beam failure recovery was recently triggered (e.g., within a time period of a recency window) with respect to the use of a particular antenna beam, selection of that antenna beam for communication (e.g., use in a RACH procedure) may be avoided. A recency window utilized with respect to a beam failure event may be applicable for the current ongoing beam failure recovery RACH process (e.g., from initial RACH attempt up to preambleTransMax).

In an example where the beam historical information includes information regarding a previous RACH procedure attempt using an antenna beam of the plurality of antenna beams corresponding to a synchronization signal of the plurality of synchronization signals, history augmented antenna beam selection logic of a UE may determine (e.g., for each antenna beam of the plurality of antenna beams) if a historical selection threshold based on a RACH procedure attempt failure within a recency window is met. Determining if the historical selection threshold is met may, for example, include determining if a beam failure event was experienced in a RACH procedure attempt within the recency window, determining if any RACH procedure failure trigger was experienced within the recency window, etc. Selecting the antenna beam based at least in part on the determination may avoid selection of antenna beams of the plurality of antenna beams determined to have had a RACH procedure attempt failure within the recency window. For example, if a previous RACH attempt with respect to the use of a particular antenna beam failed recently (e.g., within a time period of a recency window), selection of that antenna beam for communication (e.g., use in a RACH procedure) may be avoided. A recency window utilized with respect to a previous RACH procedure attempt may be applicable for the current ongoing RACH process (from initial RACH attempt up to preambleTransMax).

In accordance with some aspects of the disclosure, selecting the antenna beam based at least in part on a previous RACH procedure attempt determination may additionally or alternatively consider transmission power used with respect to the previous RACH procedure attempt. For example, history augmented antenna beam selection logic of a UE may consider if a previous RACH attempt that failed using a particular antenna beam was already transmitting at greater than a threshold value (e.g., maximum permissible transmission power, predetermined transmission power, a fraction of the maximum permissible transmission power, etc.). Selecting the antenna beam based at least in part on the on a previous RACH procedure attempt determination and transmission power consideration may avoid selection of antenna beams of the plurality of antenna beams determined to have had a RACH procedure attempt failure performed at greater than the threshold value within the recency window.

In an example where the beam historical information includes information regarding recency of a measurement of an aspect of the synchronization signal corresponding to an antenna beam of the plurality of antenna beams as received when scanning the antenna beam, history augmented antenna beam selection logic of a UE may determine (e.g., for each antenna beam of the plurality of antenna beams) if a historical selection threshold based on recency of the measurement of the aspect of the synchronization signal is met. Determining if the historical selection threshold is met may, for example, include determining if measurement of the aspect of the synchronization signal has been made for the respective antenna beam within a time threshold. According to some examples, an antenna beam used for communicating a RACH procedure signal may have, of the plurality of antenna beams, most recent information regarding recency of the measurement of an aspect of the synchronization signal. Selecting the antenna beam based at least in part on the determination may implement a preference for selection of antenna beams of the plurality of antenna beams based on the information regarding recency of the measurement of the aspect of the synchronization signal, implement a preference for antenna beams having most recent information regarding recency of the measurement of the aspect of the synchronization signal, etc. For example, preference may be given to antenna beams having synchronization signal receive metrics measured more recently (e.g., within a time period of a recency window), and which satisfy other historical selection threshold (e.g., historical selection thresholds relating to previous RACH procedure attempts, PBCH decode history, etc.), compared to antenna beams having synchronization signal receive metrics measured further in the past, despite those more aged receive metrics potentially indicating higher or better values. A recency window utilized with respect to recency of the measurement of the aspect of the synchronization signal may range anywhere from 100 ms to 1 s or more, wherein a value utilized in implementing a recency window of some examples may depend on the number of UE beams, radio resource control (RRC) configuration information (e.g., BeamFailureRecoveryConfig parameters), etc.

Weighting of various beam historical information may be utilized in addition to or in the alternative to recency windows, according to some aspects of the present disclosure. For example, in a situation where the beam historical information includes information regarding a beam failure event or a previous RACH procedure attempt failure, one or more metric (e.g., receive metric, such as RSRP for the SSB used in antenna beam selection) for the respective antenna beam may be weighted according to recency information for the event (e.g., weighting the metric greater for a less recent event, weighting the metric less for a more recent event, etc.) for comparison/consideration in antenna beam selection. As another example, in a situation where the beam historical information includes recency of a measurement of an aspect of the synchronization signal, one or more metric of the measurement (e.g., receive metric, such as RSRP for the SSB used in antenna beam selection) for the respective antenna beam may be weighted according to recency of the measurement (e.g., weighting the receive metric greater for a more recent measurement, weighting the metric less for a less recent measurement, etc.) for comparison/consideration in antenna beam selection. In accordance with some examples, an antenna beam used for communicating a RACH procedure signal may have a highest weighted receive metric of the weighted receive metrics.

Figure 5:
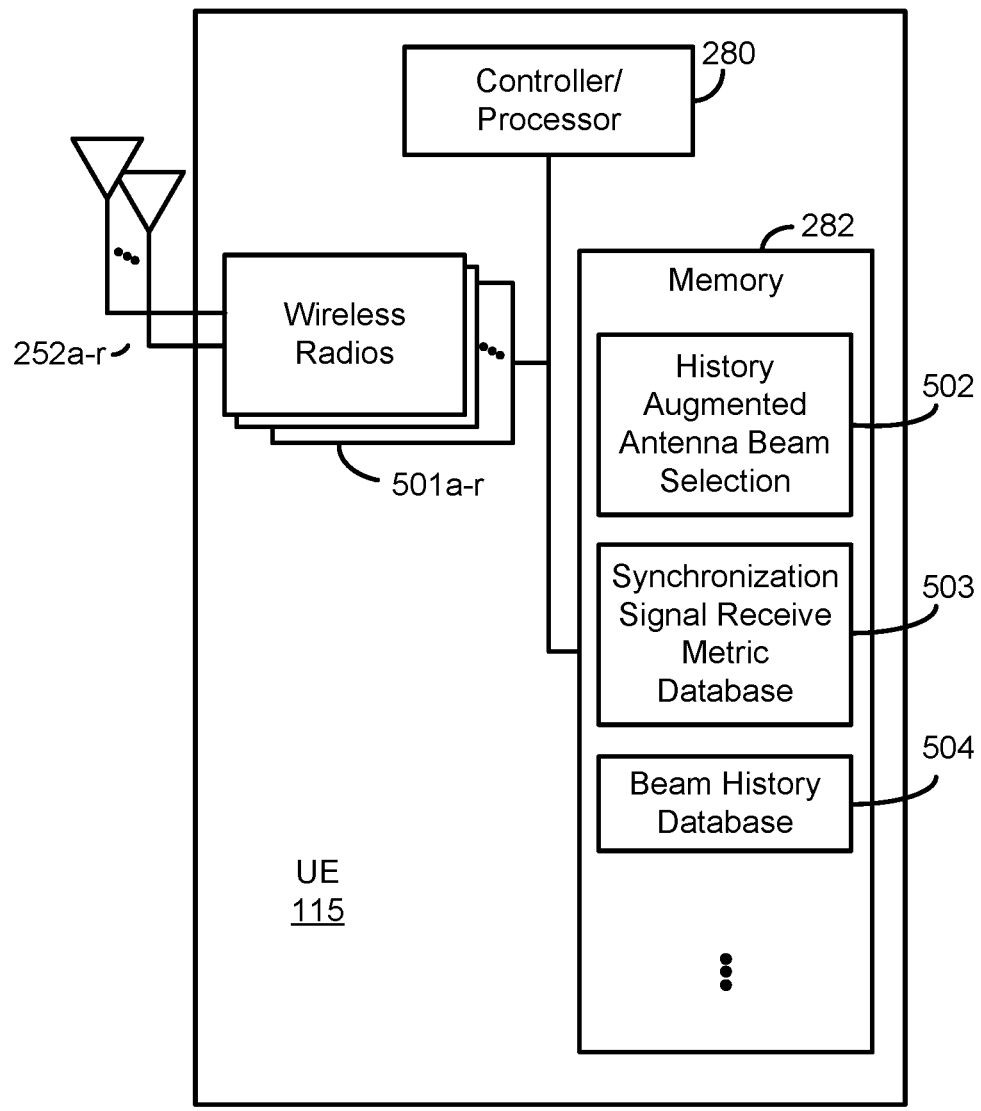
FIG. 5 is a block diagram conceptually illustrating a design of a UE configured to implement history augmented synchronization signal based antenna beam selection according to some embodiments of the present disclosure.

FIG. 5 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 501a-r and antennas 252a-r. Wireless radios 501a-r include various components and hardware, as illustrated in FIG. 2 for UE 115, including modulator/ demodulators 254*a-r*, MIMO detector 256, receive processor 258, transmit processor 264, and TX MIMO processor 266.

UE 115 of the example shown in FIG. 5 includes history augmented antenna beam selection logic 502, synchronization signal receive metric database 503, and beam history database 504 as may be utilized for performing functions as described herein. History augmented antenna beam selection logic 502 may, for example, comprise program code stored in memory 282 that is executed by controller/processor 280 for providing respective functionality. History augmented antenna beam selection logic 502 may provide functionality including history augmented synchronization signal based antenna beam selection, as may utilize receive metric information from synchronization signal receive metric database 503 and beam history information from beam history database 504, as described above. History augmented antenna beam selection logic 502 may further provide functionality facilitating or controlling communicating a RACH procedure signal using an antenna beam from the plurality of antenna beams selected in correspondence to the receive metrics and the beam historical information.

In some examples of methods, the apparatuses, and articles including non-transitory computer-readable medium described herein, various aspects of multi-slot transport block techniques may be implemented according to a multiplicity of combinations consistent with concepts described herein. Non-limiting examples of combinations of some aspects of a multi-slot transport block technique are set forth in the example clauses below.

1. Methods, apparatuses, and articles for wireless communication may provide for storing receive metrics for a plurality of synchronization signals corresponding to a plurality of antenna beams, wherein the receive metrics include a receive metric for each synchronization signal of the plurality of synchronization signals, and wherein each synchronization signal of the plurality of synchronization signals corresponds to a respective antenna beam of the plurality of antenna beams, storing beam historical information regarding one or more antenna beams of the plurality of antenna beams, and communicating a RACH procedure signal using an antenna beam from the plurality of antenna beams selected in correspondence to the receive metrics and the beam historical information.

2. The methods, apparatuses, and articles of clause 1, further providing for selecting an antenna beam from the plurality of antenna beams for RACH procedure signal communication based on the receive metrics and the beam historical information.

3. The methods, apparatuses, and articles of any of clauses 1-2, wherein the synchronization signals each comprise a SSB transmitted via a respective antenna beam of the plurality of antenna beams.

4. The methods, apparatuses, and articles of any of clauses 1-3, further providing for analyzing the beam historical information for one or more antenna beams of the plurality of antenna beams meeting a historical selection threshold, and comparing the receive metrics of the one or more antenna beams meeting the historical selection threshold, wherein the selecting the antenna beam is based at least in part on the antenna beam selected meeting the historical selection threshold and the comparing of the receive metric for the selected antenna beam.

5. The methods, apparatuses, and articles of any of clauses 1-4, wherein the antenna beam meets a historical selection threshold and the receive metric for the antenna beam is a highest receive metric of antenna beams of the plurality of antenna beams meeting the historical selection threshold.

6. The methods, apparatuses, and articles of any of clauses 1-5, further providing for weighting the receive metrics of the one or more antenna beams using recency information of the historical information, and comparing the receive metrics of the one or more antenna beams as weighted, wherein the selecting the antenna beam is based at least in part on the comparing of the receive metric for the selected antenna beam.

7. The methods, apparatuses, and articles of any of clauses 1-5, further providing for weighting the receive metrics of the one or more antenna beams using recency information of the historical information to provide weighted receive metrics, wherein a weighted receive metric of the antenna beam is a highest weighted receive metric of the weighted receive metrics.

8. The methods, apparatuses, and articles of any of clauses 1-7, wherein the beam historical information comprises information regarding a previous RACH procedure attempt using an antenna beam of the plurality of antenna beams and information regarding PBCH decode history for an antenna beam of the plurality of antenna beams.

9. The methods, apparatuses, and articles of any of clauses 1-8, wherein the beam historical information comprises information regarding a beam failure event for an antenna beam of the plurality of antenna beams corresponding to a synchronization signal of the plurality of synchronization signals.

10. The methods, apparatuses, and articles of clause 9, further providing for determining for each antenna beam of the plurality of antenna beams if a historical selection threshold based on beam failure recovery being triggered within a recency window is met, wherein the selecting the antenna beam is based at least in part on a determination provided by the determining.

11. The methods, apparatuses, and articles of any of clauses 9-10, wherein the determining if the historical selection threshold is met provides for determining if a beam failure event was experienced in a previous RACH procedure attempt within the recency window.

12. The methods, apparatuses, and articles of any of clauses 9-11, wherein the determining if the historical selection threshold is met provides for determining if a beam failure event was experienced based upon any beam failure trigger within the recency window.

13. The methods, apparatuses, and articles of any of clauses 9-12, wherein the selecting the antenna beam avoids selection of antenna beams of the plurality of antenna beams determined to have failed to meet the historical selection threshold based on a beam failure recovery triggered within the recency window.

14. The methods, apparatuses, and articles of any of clauses 9-13, wherein the antenna beam meets a historical selection threshold for beam failure recovery being triggered within a recency window.

15. The methods, apparatuses, and articles of any of clauses 9-14, wherein the historical selection threshold corresponds to a beam failure event experienced in a previous RACH procedure attempt within the recency window.

16. The methods, apparatuses, and articles of any of clauses 1-15, wherein the beam historical information comprises information regarding a previous RACH procedure attempt using an antenna beam of the plurality of antenna beams corresponding to a synchronization signal of the plurality of synchronization signals.

17. The methods, apparatuses, and articles of clause 16, further providing for determining for each antenna beam of the plurality of antenna beams if a historical selection threshold based on a RACH procedure attempt failure within a recency window is met, wherein the selecting the antenna beam is based at least in part on a determination provided by the determining.

18. The methods, apparatuses, and articles of clause 17, wherein the determining if the historical selection threshold is met provides for determining if a beam failure event was experienced in the RACH procedure attempt within the recency window.

19. The methods, apparatuses, and articles of clause 17, wherein the determining if the historical selection threshold is met provides for determining if any RACH procedure failure trigger was experienced within the recency window.

20. The methods, apparatuses, and articles of any of clauses 17-19, wherein the selecting the antenna beam avoids selection of antenna beams of the plurality of antenna beams determined to have had a RACH procedure attempt failure within the recency window.

21. The methods, apparatuses, and articles of any of clauses 17-20, further providing for determining whether transmission during the RACH procedure attempt that failed was performed at less than a maximum permitted transmission power.

22. The methods, apparatuses, and articles of clause 21, wherein selecting the antenna beam is based at least in part on a transmission power used for transmission during the RACH procedure attempt that failed.

23. The methods, apparatuses, and articles of clause 21, wherein selecting the antenna beam avoids selection of antenna beams of the plurality of antenna beams determined to have had a RACH procedure attempt failure performed at a transmission power greater than a threshold value within the recency window.

24. The methods, apparatuses, and articles of any of clauses 17-23, wherein the antenna beam meets a historical selection threshold based on a RACH procedure attempt failure within a recency window.

25. The methods, apparatuses, and articles of clause 24, wherein the historical selection threshold corresponds to a beam failure event experienced in the RACH procedure attempt within the recency window.

26. The methods, apparatuses, and articles of any of clauses 24-25, wherein transmission during the RACH procedure attempt that failed using the antenna beam was performed at less than a maximum permitted transmission power.

27. The methods, apparatuses, and articles of any of clauses 1-26, wherein the beam historical information comprises information regarding recency of a measurement of an aspect of the synchronization signal corresponding to an antenna beam of the plurality of antenna beams as received when scanning the antenna beam.

28. The methods, apparatuses, and articles of clause 27, wherein selecting the antenna beam implements a preference for selection of antenna beams of the plurality of antenna beams based on the information regarding recency of the measurement of the aspect of the synchronization signal.

29. The methods, apparatuses, and articles of clause 28, wherein selecting the antenna beam implements a preference for antenna beams having most recent information regarding recency of the measurement of the aspect of the synchronization signal.

30. The methods, apparatuses, and articles of any of clauses 27-29, further providing for determining for each antenna beam of the plurality of antenna beams if a historical selection threshold based on recency of the measurement of the aspect of the synchronization signal is met, wherein the selecting the antenna beam is based at least in part on a determination provided by the determining.

31. The methods, apparatuses, and articles of clause 30, wherein the determining if the historical selection threshold is met provides for determining if measurement of the aspect of the synchronization signal has been made for the respective antenna beam within a time threshold.

32. The methods, apparatuses, and articles of clause 27, wherein the antenna beam has, of the plurality of antenna beams, most recent information regarding recency of the measurement of the aspect of the synchronization signal.

33. The methods, apparatuses, and articles of clause 27, wherein the antenna beam meets a historical selection threshold based on recency of the measurement of the aspect of the synchronization signal.

34. The methods, apparatuses, and articles of clause 33, wherein the historical selection threshold corresponds to measurement of the aspect of the synchronization signal having been made for the antenna beam within a time threshold.

35. The methods, apparatuses, and articles of any of clauses 1-34, further providing for scanning each antenna beam of the plurality of antenna beams serially, and measuring an aspect of the synchronization signal corresponding to an antenna beam of the plurality of antenna beams as received when the scanning is scanning the antenna beam, wherein the receive metric for each synchronization signal comprises a measured aspect for the respective antenna beam of the plurality of antenna beams obtained by the measuring.

36. The methods, apparatuses, and articles of clause 35, wherein the measured aspect comprises a RSRP.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein (e.g., the functional blocks and modules in FIG. 2) may comprise processors, electronics devices, hardware devices, electronics components, logical circuits, memories, software codes, firmware codes, etc., or any combination thereof. In addition, features discussed herein relating to history augmented synchronization signal based antenna beam selection may be implemented via specialized processor circuitry, via executable instructions, and/or combinations thereof.

Those of skill would further appreciate that the various illustrative logical blocks, modules, circuits, and algorithm steps (e.g., the logical blocks in FIG. 4) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   storing receive metrics for a plurality of synchronization signals corresponding to a plurality of antenna beams, wherein the receive metrics include a receive metric for each synchronization signal of the plurality of synchronization signals, and wherein each synchronization signal of the plurality of synchronization signals corresponds to a respective antenna beam of the plurality of antenna beams;
   storing beam historical information regarding one or more antenna beams of the plurality of antenna beams; and
   communicating a random access channel (RACH) procedure signal using an antenna beam from the plurality of antenna beams selected in correspondence to the receive metrics and the beam historical information.

2. The method of claim 1, wherein the synchronization signals each comprise a synchronization signal block (SSB) transmitted via a respective antenna beam of the plurality of antenna beams.

3. The method of claim 1, wherein the antenna beam meets a historical selection threshold and the receive metric for the antenna beam is a highest receive metric of antenna beams of the plurality of antenna beams meeting the historical selection threshold.

4. The method of claim 1, further comprising:
   weighting the receive metrics using recency information of the beam historical information to provide weighted receive metrics, wherein a weighted receive metric of the antenna beam is a highest weighted receive metric of the weighted receive metrics.

5. The method of claim 1, wherein the beam historical information comprises information regarding a previous RACH procedure attempt using an antenna beam of the plurality of antenna beams and information regarding physical broadcast channel (PBCH) decode history for an antenna beam of the plurality of antenna beams.

6. The method of claim 1, wherein the beam historical information comprises information regarding a beam failure event for an antenna beam of the plurality of antenna beams corresponding to a synchronization signal of the plurality of synchronization signals, and wherein the antenna beam meets a historical selection threshold for beam failure recovery being triggered within a recency window.

7. The method of claim 6, wherein the historical selection threshold corresponds to a beam failure event experienced in a previous RACH procedure attempt within the recency window.

8. The method of claim 1, wherein the beam historical information comprises information regarding a previous RACH procedure attempt using an antenna beam of the plurality of antenna beams corresponding to a synchronization signal of the plurality of synchronization signals, and wherein the antenna beam meets a historical selection threshold based on a RACH procedure attempt failure within a recency window.

9. The method of claim 8, wherein the historical selection threshold corresponds to a beam failure event experienced in the RACH procedure attempt within the recency window.

10. The method of claim 8, wherein transmission during the RACH procedure attempt that failed using the antenna beam was performed at less than a maximum permitted transmission power.

11. The method of claim 1, wherein the beam historical information comprises information regarding recency of a measurement of an aspect of the synchronization signal corresponding to the respective antenna beam of the plurality of antenna beams as received when scanning the antenna beam.

12. The method of claim 11, wherein the antenna beam has, of the plurality of antenna beams, most recent information regarding recency of the measurement of the aspect of the synchronization signal.

13. The method of claim 11, wherein the antenna beam meets a historical selection threshold based on recency of the measurement of the aspect of the synchronization signal.

14. The method of claim 13, wherein the historical selection threshold corresponds to measurement of the aspect of the synchronization signal having been made for the antenna beam within a time threshold.

15. The method of claim 1, further comprising:
scanning each antenna beam of the plurality of antenna beams serially; and
measuring an aspect of the synchronization signal corresponding to each respective antenna beam of the plurality of antenna beams as received when scanning the respective antenna beam, wherein the receive metric for each synchronization signal comprises a measured aspect for the respective antenna beam of the plurality of antenna beams obtained by the measuring.

16. An apparatus configured for wireless communication, the apparatus comprising:
at least one processor; and
a memory coupled to the at least one processor, wherein the at least one processor is configured to:
store receive metrics for a plurality of synchronization signals corresponding to a plurality of antenna beams, wherein the receive metrics include a receive metric for each synchronization signal of the plurality of synchronization signals, and wherein each synchronization signal of the plurality of synchronization signals corresponds to a respective antenna beam of the plurality of antenna beams;
store beam historical information regarding one or more antenna beams of the plurality of antenna beams; and
communicate a random access channel (RACH) procedure signal using an antenna beam from the plurality of antenna beams selected in correspondence to the receive metrics and the beam historical information.

17. The apparatus of claim 16, wherein the synchronization signals each comprise a synchronization signal block (SSB) transmitted via a respective antenna beam of the plurality of antenna beams.

18. The apparatus of claim 16, wherein the antenna beam meets a historical selection threshold and the receive metric for the antenna beam is a highest receive metric of antenna beams of the plurality of antenna beams meeting the historical selection threshold.

19. The apparatus of claim 16, wherein the at least one processor is configured to:
weight the receive metrics using recency information of the beam historical information to provide weighted receive metrics, wherein a weighted receive metric of the antenna beam is a highest weighted receive metric of the weighted receive metrics.

20. The apparatus of claim 16, wherein the beam historical information comprises information regarding a previous RACH procedure attempt using an antenna beam of the plurality of antenna beams and information regarding physical broadcast channel (PBCH) decode history for an antenna beam of the plurality of antenna beams.

21. The apparatus of claim 16, wherein the beam historical information comprises information regarding a beam failure event for an antenna beam of the plurality of antenna beams corresponding to a synchronization signal of the plurality of synchronization signals, and wherein the antenna beam meets a historical selection threshold for beam failure recovery being triggered within a recency window.

22. The apparatus of claim 21, wherein the historical selection threshold corresponds to a beam failure event experienced in a previous RACH procedure attempt within the recency window.

23. The apparatus of claim 16, wherein the beam historical information comprises information regarding a previous RACH procedure attempt using an antenna beam of the plurality of antenna beams corresponding to a synchronization signal of the plurality of synchronization signals, and wherein the antenna beam meets a historical selection threshold based on a RACH procedure attempt failure within a recency window.

24. The apparatus of claim 23, wherein the historical selection threshold corresponds to a beam failure event experienced in the RACH procedure attempt within the recency window.

25. The apparatus of claim 23, wherein transmission during the RACH procedure attempt that failed using the antenna beam was performed at less than a maximum permitted transmission power.

26. The apparatus of claim 16, wherein the beam historical information comprises information regarding recency of a measurement of an aspect of the synchronization signal corresponding to the respective antenna beam of the plurality of antenna beams as received when scanning the antenna beam.

27. The apparatus of claim 26, wherein the antenna beam has, of the plurality of antenna beams, most recent information regarding recency of the measurement of the aspect of the synchronization signal.

28. The apparatus of claim 26, wherein the antenna beam meets a historical selection threshold based on recency of the measurement of the aspect of the synchronization signal.

29. The apparatus of claim 28, wherein the historical selection threshold corresponds to measurement of the aspect of the synchronization signal having been made for the antenna beam within a time threshold.

30. The apparatus of claim 16, wherein the at least one processor is configured to:
   scan each antenna beam of the plurality of antenna beams serially; and
   measure an aspect of the synchronization signal corresponding to each antenna beam of the plurality of antenna beams as received when scanning the respective antenna beam, wherein the receive metric for each synchronization signal comprises a measured aspect for the respective antenna beam of the plurality of antenna beams obtained by the measuring.

\* \* \* \* \*